US011216563B1

(12) United States Patent
Veselov et al.

(10) Patent No.: US 11,216,563 B1
(45) Date of Patent: Jan. 4, 2022

(54) SECURITY ASSESSMENT OF VIRTUAL COMPUTING ENVIRONMENT USING LOGICAL VOLUME IMAGE

(71) Applicant: Amazon Technologies, Inc., Seattle, WA (US)

(72) Inventors: Vladimir Veselov, Ashburn, VA (US); Aparna Nagargadde, Herndon, VA (US); Adrian-Radu Grajdeanu, Great Falls, VA (US)

(73) Assignee: Amazon Technologies, Inc., Seattle, WA (US)

( * ) Notice: Subject to any disclaimer, the term of this patent is extended or adjusted under 35 U.S.C. 154(b) by 141 days.

(21) Appl. No.: 15/600,554

(22) Filed: May 19, 2017

(51) Int. Cl.
*G06F 21/00* (2013.01)
*G06F 21/57* (2013.01)
*H04L 29/06* (2006.01)
*G06F 9/455* (2018.01)

(52) U.S. Cl.
CPC ........ *G06F 21/577* (2013.01); *G06F 9/45558* (2013.01); *H04L 63/1433* (2013.01); *G06F 2009/45587* (2013.01); *G06F 2221/034* (2013.01)

(58) Field of Classification Search
CPC .............. G06F 21/577; G06F 9/45558; G06F 2009/45587; G06F 2221/034; H04L 63/1433
See application file for complete search history.

(56) References Cited

U.S. PATENT DOCUMENTS

| 9,141,683 | B1* | 9/2015 | Nagargadde | G06F 11/1464 |
| 2007/0143839 | A1* | 6/2007 | Chen | G06F 21/629 |
| | | | | 726/17 |
| 2011/0126198 | A1* | 5/2011 | Vilke | G06F 9/54 |
| | | | | 718/1 |
| 2012/0054740 | A1* | 3/2012 | Chakraborty | G06F 9/45558 |
| | | | | 718/1 |
| 2012/0072968 | A1* | 3/2012 | Wysopal | G06F 11/3612 |
| | | | | 726/1 |
| 2013/0024940 | A1* | 1/2013 | Hutchins | G06F 9/45558 |
| | | | | 726/24 |

(Continued)

*Primary Examiner* — Trong H Nguyen
*Assistant Examiner* — Michael M Lee
(74) *Attorney, Agent, or Firm* — Nicholson De Vos Webster & Elliott LLP

(57) ABSTRACT

Systems for performing a security assessment of a target computing resource, such as a virtual machine or an instance of a virtual machine, include a scanning service that facilitates duplication of all or a portion of the target computing resource, and then performs the security assessment on the duplicate computing resource to avoid consuming processing time, processing power, and storage space of the target computing resource. A snapshot of the target computing resource, containing the data necessary to reproduce the portion to be assessed, is captured and used to implement the duplicate computing resource in newly allocated resources. The snapshot can be an image of a logical volume implementing the target computing resource. To reproduce a target virtual machine, the snapshot may include a configuration used to instantiate the target virtual machine; the scanning service may implement a duplicate virtual machine that is instantiated with the same configuration.

19 Claims, 9 Drawing Sheets

(56) References Cited

U.S. PATENT DOCUMENTS

| | | | |
|---|---|---|---|
| 2013/0247133 A1* | 9/2013 | Price | G06F 21/577 |
| | | | 726/1 |
| 2015/0052519 A1* | 2/2015 | Yu | G06F 9/45541 |
| | | | 718/1 |
| 2015/0199207 A1* | 7/2015 | Lin | G06F 9/45533 |
| | | | 718/1 |
| 2015/0378769 A1* | 12/2015 | Buck | G06F 9/5072 |
| | | | 718/1 |
| 2016/0132347 A1* | 5/2016 | Brandwine | G06F 9/5088 |
| | | | 718/1 |
| 2016/0246681 A1* | 8/2016 | Tsirkin | G06F 11/1451 |
| 2016/0283949 A1* | 9/2016 | Chai | G06F 21/53 |
| 2016/0366135 A1* | 12/2016 | Furuichi | H04L 41/085 |
| 2017/0272449 A1* | 9/2017 | Gilpin | G06F 9/5077 |
| 2017/0300705 A1* | 10/2017 | Jassal | G06F 21/6218 |
| 2018/0063088 A1* | 3/2018 | Hardy | H04L 63/0272 |

\* cited by examiner

SECURITY ASSESSMENT OF VIRTUAL COMPUTING ENVIRONMENT USING LOGICAL VOLUME IMAGE

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. The single physical computing device may create, maintain, delete, or otherwise manage virtual machines in a dynamic manner. In some scenarios, various computing devices may be associated with different combinations of operating systems or operating system configurations, virtualized hardware resources, and software applications to enable a computing device to provide different desired functionalities, or to provide similar functionalities more efficiently. Virtual machines may themselves be partitioned into multiple isolated virtual systems, called "containers." The virtual machine controls allocation of resources such as processing power and memory, and each container has its own process and network space in which the container may, for example, execute software programs.

In such a system, a service provider may operate networks of systems to provide access to software using varying numbers of virtual machine resources. The large numbers of customers, end users, virtual machine configurations, software packages, and hardware computing devices invite security issues to arise. The service provider may thus provide or enable security assessment services that analyze the behavior of computing resources to identify vulnerabilities, bad configurations, and the like.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
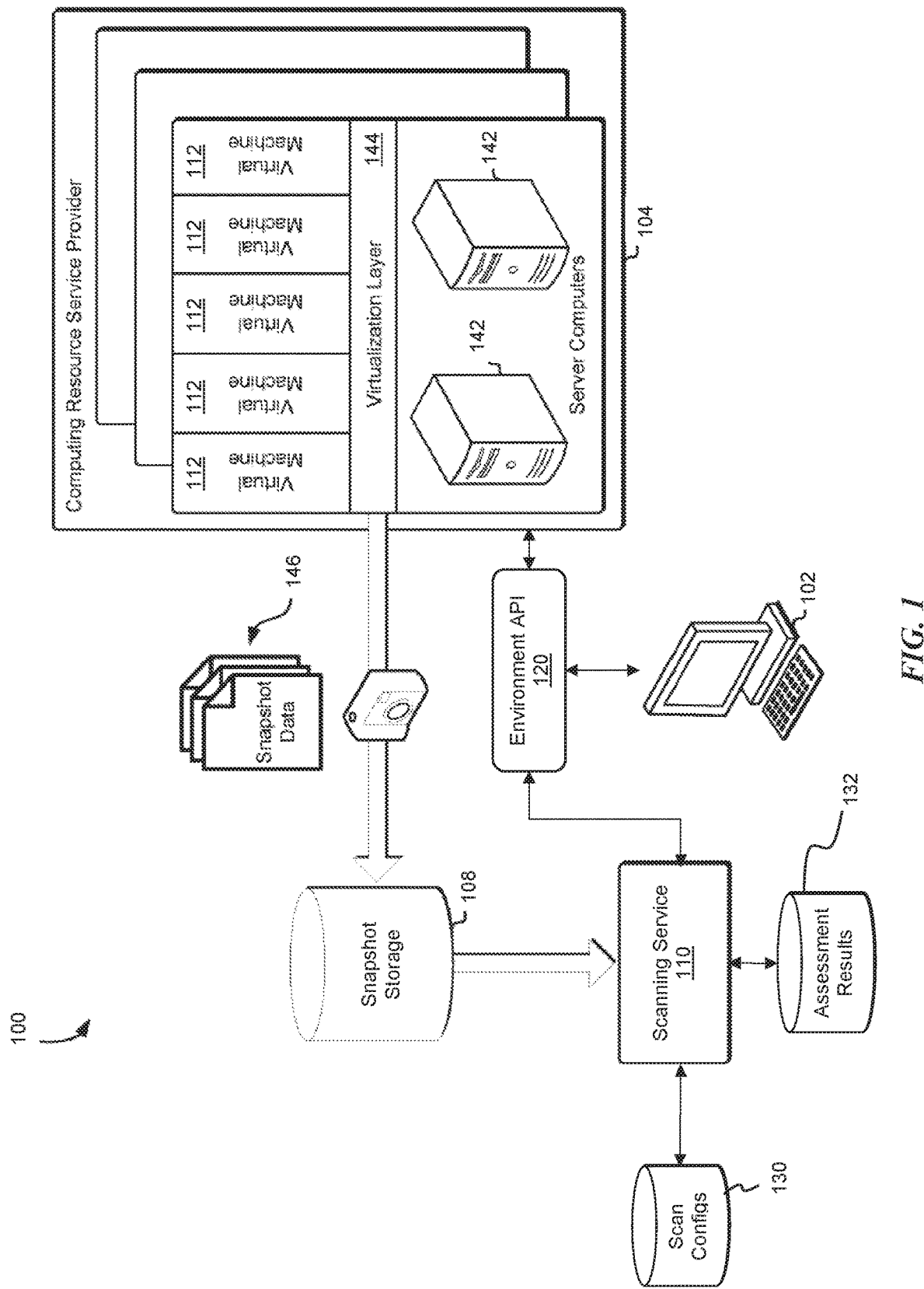
FIG. 1 is a diagram illustrating an example system for executing an example security assessment of a virtual computing environment, in accordance with the present disclosure.

In various embodiments, including without limitation the example embodiments illustrated and described herein, the present disclosure provides systems and methods for performing security assessments of virtualized compute resources and the hardware computing devices that implement them. The presently described systems and methods are particularly suited for security assessments performed in a data center at any level of abstraction, non-limiting examples including: block-level storage devices, memory, hard disk drives, and other physical volumes; file systems; logical volumes and partitions; operating systems and virtual file systems; application-specific frameworks; and virtual machines and virtual environments implementing virtual machines. The present disclosure contemplates implementation of any suitable security assessment, including security assessments that are defined by rules packages, such as Common Vulnerabilities and Exposures (CVEs), Center for Internet Security (CIS) benchmarks, "best practices" packages, static or runtime behavior analysis, host configuration assessments, and the like.

The present systems and methods overcome drawbacks of existing security assessment systems, such as allocation and overuse of processing power, unavailability of resources services that are part of the assessment, and complexity of installation and monitoring of the assessment system. A security assessment may involve sending requests and/or other information to one or more targets, such as a virtual machine, a group of interconnected virtual machines, a container of a virtual machine, a software application, a service, a server, a hard disk drive or logical volume, etc., recording how the one or more targets respond, and comparing the response data to security rules to determine whether the target is vulnerable. The security of the target can be evaluated based on how the target(s) respond during the assessment. Performing a robust security assessment on a target computing device, such as a server, may reduce the target computing device's capabilities. For example, a server that is the target of a security assessment may not be capable of responding to a client as quickly as normal, or may not be capable of providing content as quickly as possible because processor time and memory of the target is used to perform the assessment instead of running its normal workload.

This problem may become more acute when the target of the security assessment is a service or distributed application being provided using a distributed computing environment (e.g., a "cloud" computing environment). In such a computing environment, the physical computing device that provides the service or distributed application may change over time (including, e.g., the servers hosting the target, network address(es) associated with the physical computing devices hosting the target, etc.). Additionally, in some cases, the service provider (i.e., the entity operating the infrastructure used to run the service or distributed application) may monitor the use of computing resources; a security assessment executed using the computing resources may be costly monetarily, as well as requiring an extended period of downtime. Further exacerbating these problems, some security assessments may evaluate targets or connections that exist only within a virtual computing environment (i.e., a virtual network effectuated by the service provider), and may not be accessible from outside of the virtual computing environment. In such cases, the security assessment must be performed inside the environment, which may require the installation of secure software modules in the target resources.

The present disclosure describes a scanning system and associated methods for performing security assessments on virtualized reproductions of the computing resource(s) that is/are the target of the security assessment. In various embodiments, the scanning system obtains, or obtains access to, a state of the resource at a point in time (e.g., a "snapshot") prior to, or in conjunction with, initiating the security assessment. The snapshot may include all of the data needed to recreate the state of the computing resource within a duplicate, virtual computing resource. For example, the target computing resource may be an instance of a virtual machine implemented within block-level storage device resources allocated to a logical volume. The snapshot may be a copy of the state of memory, the state of any devices (virtual or physical) allocated to the resource, block-level image of the entire logical volume; or, the snapshot may be an image of only a portion of the logical volume containing the data required to embody an exact copy of the virtual machine instance; or the snapshot may simply be a copy of certain files of the target computing resource, such as a database of software packages installed in a virtual machine.

The scanning system may then obtain the computing resources needed to implement a copy of the virtual machine instance, such as by allocating another logical volume from available data storage resources. In some embodiments, the resources for the duplicate virtual machine instance may be within a virtual computing environment of the original virtual machine instance, while in certain embodiments the duplicate virtual machine instance may be implemented outside of the original virtual computing environment, such as within an account of the service provider used to perform analysis on resources. The scanning system may implement the duplicate virtual machine instance in any manner that allows the scanning system to perform the desired security assessment on the duplicate instance. In one embodiment, the scanning system may set up and launch an active virtual machine instance in the allocated computing resources, the active virtual machine instance having the same configuration as the original virtual machine instance had at the time the snapshot was captured; the system may then perform the security assessment on the active virtual machine instance in a static or runtime environment. In another embodiments, the scanning system may mount the logical volume (or transform the snapshot into a data file by identifying the file system of the original logical volume and then mount the snapshot in the duplicate logical volume) as a hard drive with data stored thereon; the system may then perform the security assessment on the data at the file system level.

In any case, the snapshot is prepared so that the security assessment produces the results that the scanning system otherwise would have obtained if the security assessment were performed on the original virtual machine instance. The scanning system may store the assessment results, or provide them to an owner or administrator of the virtual machine in order to evaluate the vulnerabilities of the target resources. The scanning system may then delete the snapshot or alternatively store the snapshot in the account of the user so that the user can perform additional analysis on the snapshot. In some embodiments, the scanning system may enable the owner to authorize periodic assessments of the target resources via a user interface, and then may obtain and analyze snapshots on a scheduled basis. The scanning system may perform historical analysis of multiple sequential snapshots stored in a database, to identify changes in the virtual computing environment that may have caused or resolved certain vulnerabilities.

Referring to FIG. 1, embodiments of the present disclosure may operate within or upon a computing environment 100 in which users, e.g., developers, customers, administrators, and other "users" that may hold a "user account" with a computing resource service provider 104, may use user devices 102 to request and manage allocation of physical resources of computing devices (e.g., server computers 142) as virtual computing resources provided by a network-accessible services system 110 allocated within a virtual computing environment implemented by the computing resource service provider 104. In some embodiments, the computing resource service provider 104 may provide, or otherwise be compatible with, an environment application programming interface (API) 120 through which a user device 102 can connect to one or more virtual computing environments of the computing resource service provider 104. For example, the API 120 may be a web-based interface implemented on a web server of the computing resource service provider 104 as described further below; one or more user interfaces may be transmitted to the user device 102 and displayed thereon, enabling the user of the user device 102 to provide settings, commands, software packages, and other user input, to the computing resource service provider 104. Such user input may be used to configure virtual computing environments of the computing resource service provider 104 that are associated with the user, such as via a user account; the user may be required to provide credentials and be authenticated and authorized to modify its virtual computing environments and virtual resource allocations via the API 120.

Within the computing environment 100, a scanning service 110 in accordance with the present disclosure may perform security assessments of one or more physical and/or virtual computing resources of the computing resource service provider 104. In some embodiments, the scanning service 110 may obtain and analyze snapshot data 146. The scanning service 110, which may be implemented by physical hardware, may be used by the computing resource service provider 104 to provide security risk information to customers and/or other services of the computing resource service provider 104. The scanning service 110 may include or be implemented on one or more computing devices. In some embodiments (e.g., as illustrated in FIG. 3B and described below), the scanning service 110 may be a component of the computing resource service provider 104, and may be implemented on the server computers 142 described in detail below. In other embodiments including the example of FIG. 1, the scanning service 110 may be implemented on one or more computing devices (not shown) outside of the computing resource service provider 104. The scanning service 110 may access the computing resource service provider 104, or any associated virtual computing environments and/or computing resources, via the API 120 or another API. In some embodiments, the scanning service 110 may use the API 120 to provide user interfaces to the user device 102, enabling the user to configure settings of the scanning service 110 as described further below.

The scanning service 110 may be configured to perform security assessments and produce assessment results based at least in part on snapshot data 146 obtained from customers or from services of the computing resource service provider 104. That is, in some embodiments a user may provide some or all of the snapshot data 146 to the scanning service 110, such as by uploading (e.g., via the API 120) the snapshot data 146 to a data store or data storage service (e.g., snapshot storage service 108) accessible by the scanning service 110. In other embodiments, a service of the computing resource service provider 104 may provide the snapshot data 146 to the scanning service 110, or may store the snapshot data 146 or otherwise make the snapshot data 146 accessible by the scanning service 110.

The physical hardware implementing any of the physical, logical, and/or virtual computing resources, the computing resource service provider 104, and/or the scanning service 110, may include one or more server computers. A server computer (e.g., server computers 142 implementing the virtual machine instances 112) may be any device or equipment configured to execute instructions for performing data computation, manipulation, or storage tasks, such as a computer or a server. A server computer may be equipped with any needed processing capability including one or more processors, such as a central processing unit (CPU), a graphics processing unit (GPU) or a digital signal processor (DSP), memory, including static and dynamic memory, and buses and input and output ports that are compliant with any handshaking, communications, or data transfer protocol. The physical hardware may also include storage devices, such as block-level storage devices, storage disks and tapes, networking equipment, and the like.

A virtualization layer 144 executing on a server computer 142 may include a bare metal hypervisor or a hosted hypervisor. The virtualization layer 144 enables the physical hardware to be used to provide computing resources upon which one or more virtual machines 112 or other computing resources may operate. For example, the virtualization layer 144 enables a particular virtual machine 312 to access physical hardware on the server computer 142 through virtual device drivers or other executable code on the virtual machine 112. The virtualization layer 144 may include a hypervisor or virtualization software and/or hardware. The virtualization layer 144 may also include an instance of an operating system dedicated to administering the virtual machine 112 or other computing resource executing on the server computer 142. The virtualization layer 144 may be any device, software, or firmware used for providing a virtual computing platform and/or virtualized computing resources for the virtual machine 112 and/or component thereof. The virtualization layer 144 may also receive and process API calls from external devices or services. There may be multiple virtualization layers 144 of the same or different types implemented on a server computer 142, such as a dedicated layer 144 for each different type virtual machine 112, or for each different virtual computing environment implementing multiple instances of the same or different virtual machines. Each virtualization layer 144 may include its own networking software stack, responsible for communication with other virtualization layers 144 and, at least in some embodiments, also responsible for implementing network connectivity between the virtual machine 112 or other computing resources executing on one server computer 142 and other computing resources present or executing on other server computers.

The virtual computing environments enabled by the virtualization layer(s) 144 may include various virtual computer components, such as one or more virtual CPUs, virtual memory, virtual disk storage, and the like. These virtual computer components, and other physical and virtual resources, may be discretized into instances of one or more virtual machines 112. The virtual machine 112 or components thereof may be provided to the customers, end users, and/or other services inside or outside of the service provider 104. For example, a server computer 142 may host a first virtual machine 112 instantiated from a first volume image and operated by a first customer and may host a second virtual machine 112 instantiated from a second volume image that is operated by a second customer. Further, the computing resource service provider 104 may use one or more of its own virtual machines 112 for supporting execution of its applications and providing computing resources for such applications.

The scanning service 110 enables the customers and other services of the computing resource service provider 104 to manage and operate analysis of various snapshot data 146 generated based at least in part on computing resources of the computing resource service provider 104, such as one or more virtual machines 112. In some embodiments, a desired security assessment may be initiated by receipt of a request. For example, a user device 102 may transmit a request to the scanning service 110 for a particular security assessment of one or more instances of a virtual machine 112. The request may be an API call including information corresponding to the requestor, the user associated with the virtual machine 112, the on-demand storage service 108, and/or the particular virtual machine 112. The scanning service 110 may determine the corresponding virtualization layer 144 for the virtual machine 112 identified by the request and transmit a command to the virtualization layer 144 to provide snapshot data 146 (or to provide access to snapshot data 146) corresponding to the virtual machine 112. The virtualization layer 144 may be configured to obtain the snapshot data 146 and send it to the scanning service 110 or store the snapshot data 146 via a snapshot storage service 108. Alternatively, the virtualization layer 144 may be configured to, at the expiration of an interval of time, obtain and store snapshot data 146 of the virtual machine 112.

The snapshot data 146 may be point-in time consistent. This may require that all writes to the disk are queued until a complete copy of the virtual machine 112 may be generated. Queuing the writes may cause the writes to disk to be deferred or otherwise stalled until generation of the snapshot is completed. In some embodiments, the snapshot data 146 may include only modifications to the logical volume and/or virtual machine. For example, a customer, since the last volume image was generated, may have modified only a portion of the logical volume (e.g., 4 blocks of the logical volume); virtualization layer 144 or another component of the computing resource service provider 104 may determine the portion of the logical volume and generate snapshot data 146 based at least in part on the portion of the logical volume that has been modified. This may reduce an amount of data that must be obtained to generate the snapshot data 146 and may enable the scanning service 110 to determine a timeline or history of modifications to the logical volume and/or virtual machine 112. For example, the scanning service 110 may use the timeline information to determine in which version of a logical volume (e.g., boot volume) a particular setting was modified that exposed or repaired a security vulnerability.

In other embodiments, the snapshot data 146 may not comprise copies or images of the block-level storage device, but instead may contain copies of essential files of the target computing resource, the files being required to create a reproduction of the target computing resource in the state the resource was in at the time the snapshot was created. The identification of such files may depend on a type of the target computing resource, a type of the security assessment, and various properties of the computing resource service provider 104. The amount and size of such files may be relatively minimal. In one example of reproducing a virtual machine for a software application-level CVEs assessment, the snapshot may only need to contain a template, such as a virtual machine image, from which the virtual machine is instantiated, and a copy of the virtual machine package manager database, which lists all software packages installed on the virtual machine and their configurations.

In some embodiments the virtualization layer 144 may be configured to itself generate the snapshot data 146. In other embodiments, a separate process or service of the computing resource service provider 104 is used to generate the snapshot data 146. In these embodiments, the "snapshot service" generates the snapshot data 146 using computing resources of the server computer 142 or a component thereof, and may store the snapshot data 146 in one or more storage devices of the snapshot storage service 308. The snapshot service may be a process or other executable code supported by the virtualization layer 144.

The snapshot storage service 108 may be a group of computer systems configured to store snapshot data 146 and make the snapshot data 146 accessible to one or more other computer systems, such as the scanning service 110. The snapshot storage service 108 may, in some embodiments be or access a data warehouse or a non-queryable data storage system. A data storage system and/or data storage device is queryable if the data storage system and/or data storage device enable requestors to submit data queries and receive response to the submitted data queries. For example, the snapshot storage service 108 may include a database, such as a Structured Query Language (SQL) database, which enables the customer, the scanning service 110, or other services of the computing resource service provider 104 to query the snapshot storage service 108 for information contained in or associated with the snapshot data 146 and stored by the snapshot storage service 108. For example, the snapshot data 146 may be stored with its own unique identifier as well as the identifier of the virtual machine instance from which the snapshot data 146 was derived; the snapshot storage service 108 may be queryable by either or both identifiers. In another example, the snapshot storage service 108 may be non-queryable in so much as the snapshot storage service 108 stores snapshot data 146 (e.g., volume images) as data objects which are identifiable and retrievable by a data object identifier, such as a file name or key, but does not enable queries on information contained in the snapshot storage service 108.

The snapshot storage service 108 may be a collection of computing resources configured to synchronously process requests to store and/or access data. The snapshot storage service 108 may operate using computing resources (e.g., databases) that enable the snapshot storage service 108 to locate and retrieve data quickly, to allow data to be provided in response to requests for the data. For example, the snapshot storage service 108 may maintain stored data in a manner such that, when a request for a data object is retrieved, the data object can be provided (or streaming of the data object can be initiated) in a response to the request. As noted, data stored in the snapshot storage service 108 may be organized into data objects. The data objects may have arbitrary sizes except, perhaps, for certain constraints on size. Thus, the snapshot storage service 108 may store numerous data objects of varying sizes. The snapshot storage service 108 may operate as a key value store that associates data objects with identifiers of the data objects that may be used by the customer to retrieve or perform other operations in connection with the data objects stored by the snapshot storage service 108.

The scanning service 110 performs the desired security assessment using the snapshot data 146. For example, the scanning service 110 may obtain the snapshot data 146 from the snapshot storage service 146 and may process the snapshot data 146 to generate one or more assessment results. Processing the snapshot data 146 may require applying one or more rules, instructions, and/or transformations to the snapshot data 146. In some embodiments, configurations and data for various security assessments may be stored in and retrieved from a scan data store 130 accessible by the scanning service 110. For example, the request to perform a security assessment may identify the desired security assessment, and the scanning service 110 may retrieve the security rules and other data for the identified assessment from the scan data store 130. The scanning service 110 may, in some embodiments, use the scan data to determine the parameters of the security assessment, and further to identify the data elements of the virtual machine 112 that are needed to perform the security assessment. The scanning service 110 may use this information to configure the scan environment, non-limiting examples of which include: determine that the security assessment is performed on static or dynamic data; request that the snapshot include only the subset of virtual machine instance data needed to perform the security assessment; determine whether to reconstitute an active duplicate virtual machine instance or to analyze the snapshot as a data file, as described below; determine whether to allocate a duplicate logical volume inside or outside of the computing resource service provider 104; determine where and/or how to store and/or transmit the assessment results; and the like. The scanning service 110 may perform the security assessment and obtain assessment results from the performance. The assessment results may be associated with the instance of the virtual machine 112 that was embodied in the snapshot data 146, and stored in a results data store 132 and/or delivered to the user (e.g., via the environment API 120).

Figure 2:
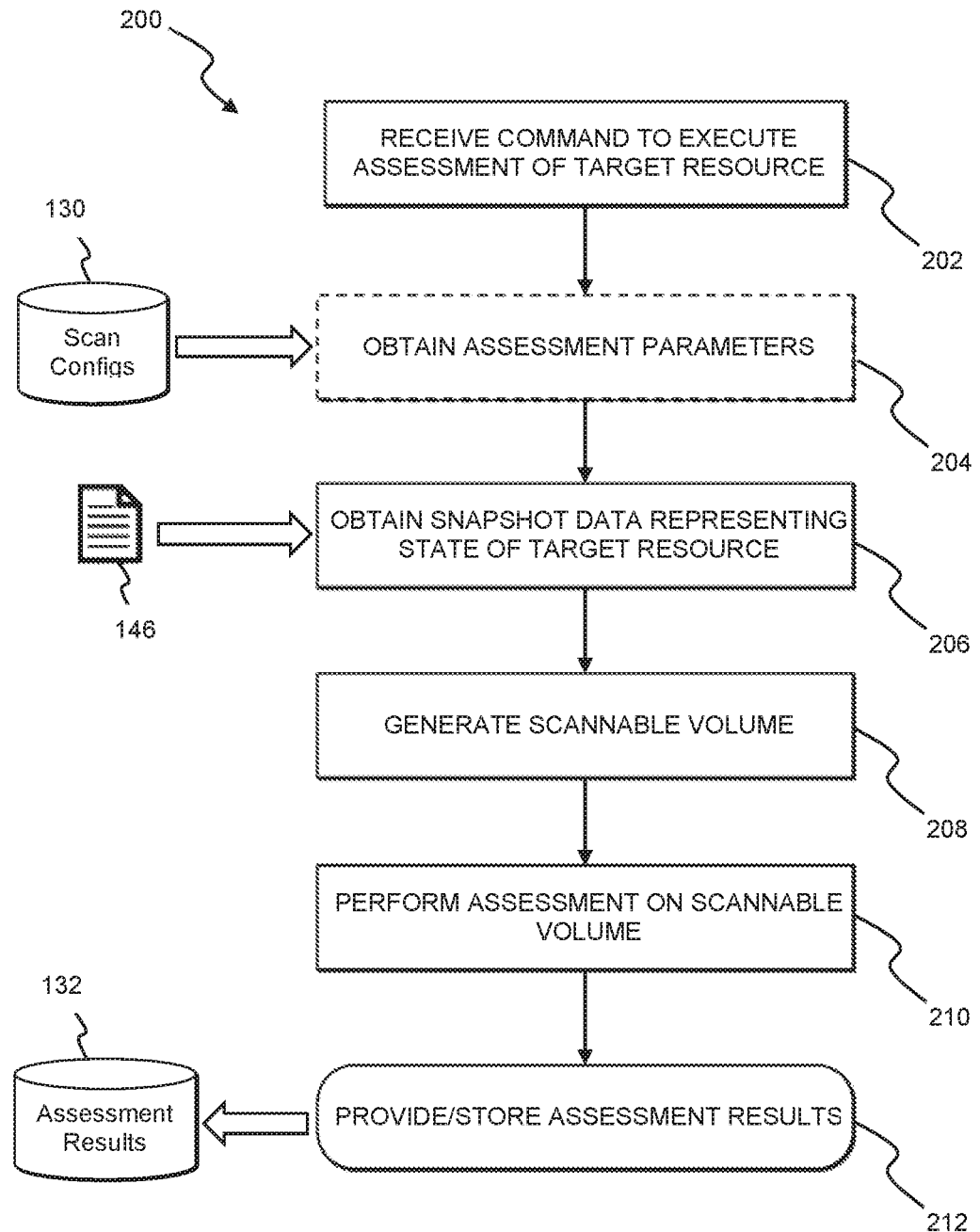
FIG. 2 is a flow diagram of an example method for executing the security assessment of one or more virtual machines in the virtual computing environment.

FIG. 2 is a block diagram illustrating an example process 200 for executing a security assessment on a target resource, which includes without limitation one or more physical and/or virtual computing resources or segment(s) thereof, such as a virtual machine, virtual machine instance, virtual computing environment implementing a plurality of virtual machine instances, logical volume, physical or virtual storage device, etc., in accordance with at least one embodiment. The process 200 may be performed by any suitable system such as a scanning service or component thereof as described above in connection with FIG. 1. At step 202, the scanning service may receive a signal to execute a security assessment of the target resource. In some non-limiting examples, the signal may be a request to perform a desired assessment sent to the scanning service by a user, or the signal may be a notification from a scheduler indicating a scheduled time to perform the security assessment has arrived; to assess a virtual machine instance, the target resource may be the instance itself or may be a logical volume may be a logical volume attached to the corresponding virtual machine and/or containing the instance. For example, the logical volume may be a boot volume utilized by a customer to launch an instance of a web server and execute applications of the web server.

At step 204, the scanning service may optionally obtain scan data describing the parameters of the security assessment to be performed. For example, the signal may include an identifier of a security assessment rules package, and the scanning service may retrieve the rules package from a scan data store. At step 206, the scanning service may obtain snapshot data representing a state of the target resource at the time the snapshot was captured. In various non-limiting examples, the scanning service may obtain the snapshot data by executing the snapshot itself, by requesting another service to capture the snapshot and provide it to the scanning service, by accessing a data store (e.g., the snapshot storage service) containing the snapshot, etc.; alternatively, the scanning system may obtain access to the snapshot data, such as at a storage location of the snapshot data, but may not obtain (i.e., make a copy of) the snapshot data. When executing or requesting the snapshot, the scanning service may include instructions identifying the data to include in the snapshot. For example, the scanning system may determine from the scan data that the security assessment will analyze the file system of a virtual machine instance, and may indicate to the snapshot service to include the file system details in the snapshot data. Additionally or alternatively, the scanning system may specify parameters related to the format of the resulting snapshot data. For example, the scanning service may cause the snapshot data to include metadata, such as a tag, that identifies the target resource embodied in the snapshot data. In some embodiments, the snapshot data may be point-in-time consistent; during the generation of the snapshot any attempts to overwrite data to be included in the snapshot may be queued or otherwise stalled until the complete snapshot is captured.

In some embodiments, described further below, the snapshot may be a volume image including an exact copy of the entire contents of some or all of the logical and/or physical data blocks allocated to storage and execution of the target resource, and any other data required to reproduce the target resource in its state at the time of capture. In other embodiments, also described below, the snapshot may be a copy of any data required to complete a reproduction of the target resource in its state at the time of capture. For example, a virtual machine instance may be 90% composed of static data that does not change between instances of the virtual machine; the snapshot may contain some or all of the data representing the 10% of the instance that may be non-uniform. The "state" of the target resource represented by the snapshot data may include any properties of the target resource instantiated in the computing resource service provider 104 that are relevant to the security assessment. Non-limiting examples of such properties include: properties of logical volume(s) containing the target resource; properties of physical storage devices allocated to the logical volumes; file system and file information; operating system information; system and software patches applied; configurations of network protocols and services; properties of connections to other computing resources; permission settings; software packages installed, and configurations thereof; system log properties; and the like.

At step 208, the scanning service may generate a scannable volume, or cause a scannable volume to be generated, based at least in part on the snapshot data. A scannable volume is any suitable configuration of computing resources allocated for the purpose of the security assessment, into which the snapshot data may be installed, mounted, copied, or otherwise applied to produce a duplicate implementation of the target resource that can be scanned by the scanning service. Examples of generating the scannable volume described below include launching a duplicate virtual machine instance in an allocated logical volume, mounting the snapshot data in an allocated logical volume like a storage device and reading the target resource state like a data file, and incorporating data elements of the snapshot data into a partial framework of the target resource to produce the duplicate target resource.

At step 210, the scanning service may perform the security assessment on the scannable volume. Generally, performing the security assessment includes applying the rules of the assessment to the properties of the reproduced target resource to produce assessment results that describe "findings" relative to the assessed properties; examples depending on the method of generating the scannable volume and the rules of the assessment are described below. At step 212, the scanning service may associate the assessment results with the target resource, such as by identifying the target resource from a metadata tag included in the snapshot data, and then may take various actions on the assessment results including without limitation: storing the assessment results in a results data store; providing the assessment results in a user-readable format to a user interface to be displayed on the user device; if vulnerabilities are identified in the assessment results, comparing the assessment results to a remediation framework to identify one or more actions the user can take to address the vulnerabilities, and providing the identified actions to the user; and the like.

Figure 3A:
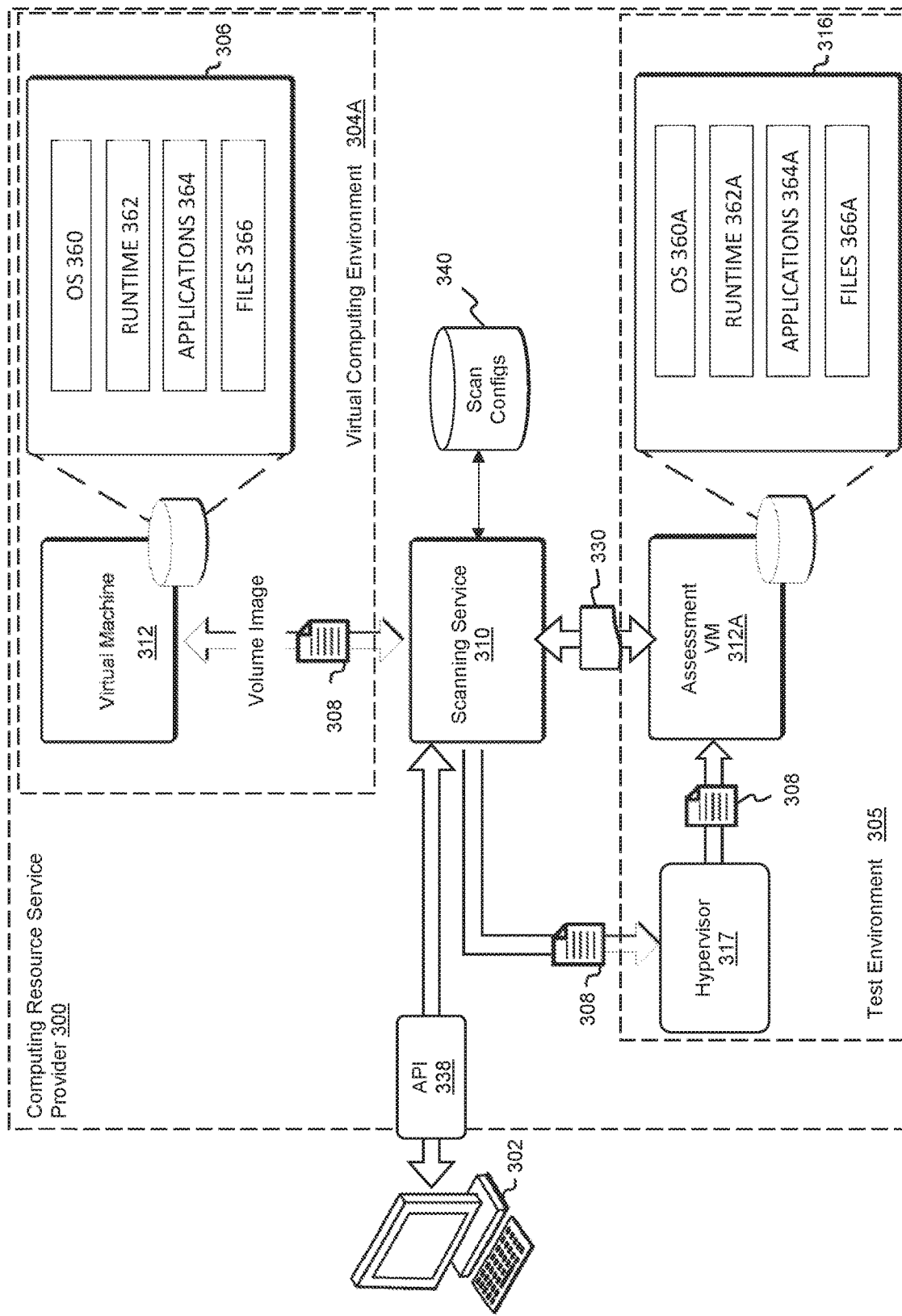
FIG. 3A is a diagram illustrating an example system for executing a security assessment of a virtual machine using a test environment, in accordance with the present disclosure.
Figure 3B:
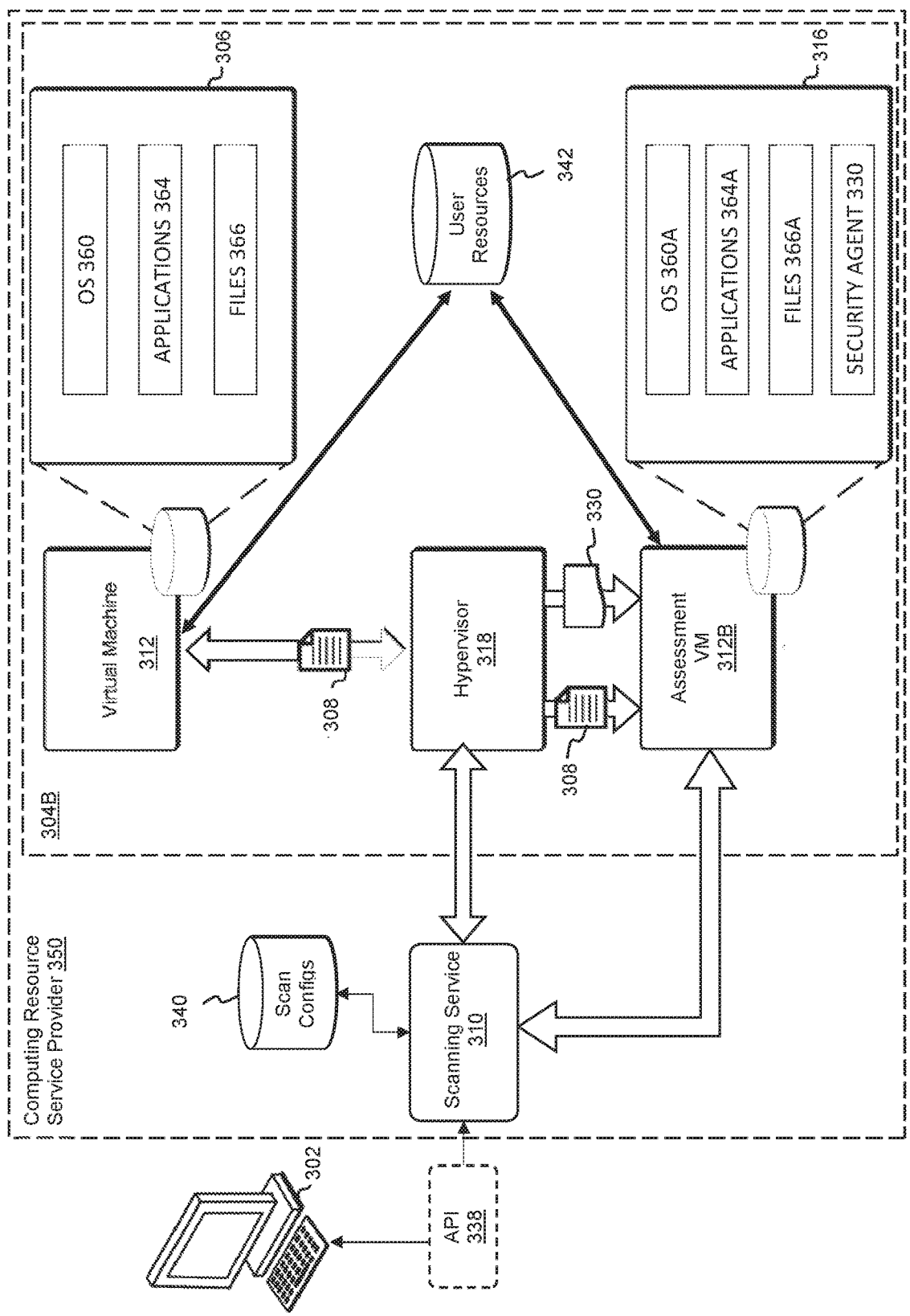
FIG. 3B is a diagram illustrating another example system for executing an example security assessment of a virtual machine, in accordance with the present disclosure.

FIGS. 3A-B illustrate example computing environments implemented by a computing resource service provider 300, 350, in which computing environments a scanning service 310 may perform a security assessment of a target resource in accordance with various embodiments. In some embodiments, the target resource is one or more executing instances of a virtual machine 312 or of a plurality of virtual machines. Instances of the virtual machine 312 may execute within a virtual computing environment 304A, 304B that may enable certain operations and interactions of instances of the virtual machine 312 as well as impose limits on operations and interactions. For example, the virtual computing environment 304A-B may isolate any instances and other virtual computing resources belonging to it, such as by employing a virtual private network and providing a secure interface for communicating with resources outside of the virtual computing environment 304A-B. In some embodiments, services and resources inside the virtual computing environment 304A-B may be isolated even from other resources and/or services of the computing resource service provider 300, 350. Subject to such limitations, the virtual machine 312 may use, exchange data, and otherwise interact with other physical and virtual computing resources of the computing resource service provider 300, 350, and also may communicate with devices external to the computing resource service provider 300, 350, such as a user device 302 and end user computing devices. For example, the computing resource service provider 300, 350 may implement a virtual network including public and/or private subnets, and the virtual machine 312 may be associated with a virtual network address; the computing resource service provider 300, 350 may further include a network interface that connects the computing resource service provider 300, 350 and one or more of its components to the internet or another communication network.

The virtual machine 312 may be executed on a server and use a logical volume 306, which is composed of a fixed or variable allocation of physical data storage resources, such as data storage blocks selected from one or more hard disk drives of one or more server computers. In one embodiment, the entire virtual machine may be stored on logical volume 306, which in turn may be stored on a physical storage device (e.g., a hard disk drive). The logical volume 306 may store data implementing and/or used by the virtual machine 312; such data may include an operating system 360, applications 364 (i.e., software packages) that can be executed by the operating system 360, and other files 366 which in various embodiments may be organized and/or accessed using a file system (e.g., NTFS, procfs). The physical device may, for example, be configured to store data of the logical volume 306 in block-level physical resources, such as on platter surfaces in microscopic magnetic regions. The logical volume 306 may be stored on one physical storage device or on multiple devices treated as a single unit such that the storage capacity of the surfaces is aggregated and made available to a hypervisor running on a server computer system, which virtualizes the storage capacity and makes it available to the virtual machine as a single unit of storage capacity. Alternatively, regions of the physical storage device may be allocated to produce a plurality of uniformly or non-uniformly sized partitions; in an example embodiment, each partition may be allocated to a logical volume, also known as a "logical drive" or "virtual disk drive" or "virtual storage device" (e.g., the logical volumes 306, 316).

A scanning service 310 tasked with performing the security assessment of the virtual machine 312 obtains snapshot data of the virtual machine 312 as described above. In particular, the snapshot data of the virtual machine 312 may be a volume image 308 of at least that portion (e.g., a partition) of the physical storage device that is associated with the logical volume 306 and/or that contains the virtual machine 312. A volume image utilized by the scanning service 310 in accordance with the present systems and methods may be any suitable type of disk image, which is a copy of the electronic data stored in one or more discrete parts, such as sectors, of a physical storage device such as a hard disk drive, tape drive, removable magnetic or optical disk, and the like. The volume image may copy the entirety of the source medium, such that the contents represented by the stored data, as well as the structure of the stored data, are contained in the volume image. A volume image's copy of the physical storage device contents may be independent of the file system (i.e., the volume image contains a block based replica of the virtual machine) and/or may include the file system of the corresponding logical volume represented by the parts of the physical stored device that are copied. The volume image may be represented, such as within another physical storage device, as one or more computer files; in various embodiments, such computer file(s) may have one or more file formats suitable for disk images, such as the ISO disk image format or a format that corresponds to a particular software application. The volume image 308 may include the entire partition in which the virtual machine 312 is implemented, or may include only a portion of the partition. For example, certain files (e.g., the operating system) may be omitted from the volume image 308 if they are not required to reproduce the virtual machine 312 for the security assessment.

In an example embodiment, the scanning service 310 may produce, or cause the production of, a duplicate of the virtual machine 312 (e.g., of an instance thereof) using the volume image; the duplicate is referred to herein as the assessment virtual machine 312A, 312B. In one example embodiment, the scanning service 310 can be programmed to cause the contents in the volume image to be stored on a second logical volume 316 (e.g., copied into a second physical storage device or partition thereof, or into a different partition of the physical storage device allocated to the first logical volume 306) and used to launch the assessment virtual machine 312A, B. For example, the scanning service 310 may send a request to a compute service operable to launch virtual machines, such as a hypervisor 317, 318. The request may indicate an identity of the security service 310 and request that a virtual machine be launched using the volume image. In response, the service operable to launch virtual machines may cause the contents in the volume image to be sent to a storage device, which is then used to boot the second virtual machine.

Referring to FIG. 3A, in some embodiments it may be suitable or advantageous to perform the security assessment on a different but similar virtual machine than the customer's virtual machine because the assessment can be performed without impacting the customer's virtual machine, which may be servicing requests from its customers or performing other useful work. For example, the virtual computing environment 304A may be a production environment in which allocating virtual computing resources to the security assessment may degrade operation of the virtual machine 312 and negatively impact functionality for end users. In another example, the virtual computing environment 304A may have computing limitations, while a separate test environment 305 of the computing resource service provider 300, 350 may lack these limitations and the security assessment may be performed faster in the test environment 305. In such embodiments, the scanning service 310 may cause the volume image 308 to be provided to a hypervisor 317 or other compute service that launches virtual machine instances within the test environment 305. In some embodiments, the compute service may copy the volume image 308 into an allocation of physical storage device resources to produce the second logical volume 316.

Additionally or alternatively, a compute service such as the hypervisor 317 may read the volume image 308 to determine the desired virtual machine configuration, and then may launch an instance of the assessment virtual machine 312A based on the determined configuration; the hypervisor 317 may then present the contents of the volume image 308 to the launched instance as the second logical volume 316. For example, the hypervisor 317 may create and/or maintain an index associating data locations of the second logical volume 316 with the actual locations of the data within the physical storage device. The hypervisor 317 may receive a read request from the virtual machine instance, the read request indicating that the instance wants to read data from one of its virtual hard disks, the second logical volume 316; to respond to the read request, the hypervisor 317 uses the index to identify which data is being read by the instance, and where on the physical storage device the data is stored. The hypervisor 317 may retrieve the data from the physical storage device and deliver the data to the requesting virtual machine instance.

Referring to FIG. 3B, in other embodiments it may be suitable or advantageous to implement the second logical volume 316, and thus the assessment virtual machine 312B, on physical resources within the same virtual computing environment 304B. For example, such embodiments may be suitable when virtual machine 312 is configured to access one or more physical or virtual resources 342 that are isolated (i.e., only accessible from) within the virtual computing environment 304B; if these data dependencies need to be evaluated during the security assessment, the assessment virtual machine 312B may be launched within the virtual computing environment 304B in order to preserve them. In one embodiment, the scanning service 310, implemented within the computing resource service provider 350 but outside of the virtual computing environment 304B, may provide the volume image 308 to a resource allocation service, such as one or more hypervisors 318 or a hypervisor coordination service, which in turn allocates the physical resources to the second logical volume 316 and installs the volume image 308 in the second logical volume. For example, the scanning service 310 may instruct the hypervisor 318 to receive the volume image 308, allocate a portion of a physical storage device to a new instance of the assessment virtual machine 312B, and present the volume image 308 to the new instance as the second logical volume 316.

In some embodiments, the one or more hypervisors 318 control allocation of physical resources of multiple different physical computing devices to virtualized components operating in the virtual computing environment 304B. For clarity of illustration, FIG. 3B illustrates a single hypervisor 318 controlling the computing resources for both the target virtual machine 312 and the assessment virtual machine 312B; the illustrated hypervisor 318 may represent multiple hypervisors 318 that, for example, each control allocation of physical resources on a different particular physical computing device. The hypervisor(s) 318 may allocate resources to and launch the assessment virtual machine 312B on different physical computing devices than the physical computing device(s) on which the target virtual machine 312 is executing. For example, a first hypervisor 318 on a first physical computing device may allocate resources to and launch the target virtual machine 312 on the first physical computing device, and a second hypervisor 318 on a second physical computing device may allocate resources to and launch the assessment virtual machine 312B on the second physical computing device. Alternatively, the assessment virtual machine 312B and the target virtual machine 312 may execute on the same physical computing device. For example, a hypervisor 318 that allocates resources of the physical computing device on which the target virtual machine 312 is executing may launch the assessment virtual machine 312B by allocating resources for the assessment virtual machine 312B and second logical volume 316 on the same physical computing device that is executing the target virtual machine 312.

Referring again to FIGS. 3A-B, the volume image 308 may be installed in the second logical volume 316 so that the assessment virtual machine 312A-B may be instantiated with the same configuration as the target instance of the original virtual machine 312 had at the time the volume image was captured. Thus, in some embodiments, the assessment virtual machine 312A-B may include an operating system 360A, runtime environment 362A, software applications 364A, and file system/files 366A that are each identical to the counterpart components 360-366 of the target virtual machine 312. In some embodiments, the assessment virtual machine 312A-B may be "viable," meaning operations of an instance of the assessment virtual machine 312A-B are not materially degraded with respect to those of the original virtual machine 312; the assessment virtual machine 312A-B may even operate exactly as the original. In other embodiments, the assessment virtual machine 312A-B may be "non-viable," in that it cannot perform material operations of the original virtual machine 312. A predominant cause of non-viability is that the virtual machine 312 performs requisite operations on dynamic data, the sources of which cannot be captured in the snapshot data (i.e., the volume image 308) without violating the data integrity. Security assessments may nonetheless be performed on a non-viable assessment virtual machine 312A-B if the assessments themselves evaluate only the static data associated with the original virtual machine 312.

In some embodiments, the scanning service 310 may perform the security assessment, as described above, on the assessment virtual machine 312A-B. The scanning service 310, having the appropriate authorizations, permissions, and other access to the assessment virtual machine 312A-B, and to any user resources 342 and other resources needed to complete the security assessment, may perform any suitable security assessment on the assessment virtual machine 312A-B and/or its underlying virtual and/or physical computing resources. In the illustrated example, the scanning service 310 installs a security agent program 330 into the assessment virtual machine 312A-B. The security agent program 330 may be a software application or software package that can be activated by the scanning service 310 to monitor activity of the assessment virtual machine 312A-B. In one embodiment, the scanning service 310 may obtain the scan data for the security assessment as described above, the scan data including a rules package and a set of instructions; the scanning service 310 sends the set of instructions to the security agent program 330, which interprets the instructions to perform assessment tasks and send the outcome of each assessment task to the scanning service 310. The scanning service 310 may compare the received outcomes to the rules in the rules package to produce the assessment results.

In various embodiments, an owner or administrator of the target computing resources to be assessed may configure one or more security assessments, such as by using the user device 302 to access the scanning service 310 via one or more APIs 338, web interfaces, and the like. Various aspects of the security assessment(s) may be configured by user input, non-limiting examples of such aspects including: selection of the assessment target(s); parameters of the security assessment(s), such as tests or tasks to perform, types of vulnerabilities to evaluate, and the like; duration of the security assessment (i.e., whether to run tests for, e.g., one minute, one hour, 24 hours, etc.); assessment scheduling, such as the time to execute the assessment and/or whether to repeat the assessment according to an interval; identification of trigger events that cause the assessment to begin; which security agents 330 to install, and on which targets; and the like. The scanning service 310 may obtain assessment information, such as by retrieving the information from the scan configuration data store 340 described above; the scanning service 310 may send the information to the user device 302 to be displayed, selected, changed, etc. For example, the scanning service 310 may obtain and present one or more templates for creating a security assessment, which templates may guide the administrator through a configuration process via a series of prompts that facilitate the scanning service's 310 collection of the relevant scan parameters. An example template may pertain to a commonly implemented security assessment, such as a Common Vulnerabilities and Exposures assessment.

Additionally or alternatively, the scanning service 310 may obtain and present one or more rules packages that describe the security assessment tasks to be performed and vulnerabilities to be corrected to achieve a particular security goal for the target resources. The user interface may enable the administrator to select the desired rules packages to be used to evaluate the target resources. In other embodiments, the administrator's selection and/or customization of a template may indicate to the scanning service 310 which rules package(s) to use in the security assessment. The scanning service 310 may create a custom scan configuration from the user input, and may store the scan configuration (e.g., in the scan configuration data store 340) for later execution and/or immediately execute the corresponding security assessment. For example, the scanning service 310 may process the entered user input as a request to execute the security assessment described by the user input. In response to receiving this example request, the scanning service 310 may determine that the request includes: an identification of the target virtual machine 312; an identification of a rules package to be used in performing the security assessment; an indication, such as a flag set to a certain value, that the security assessment is to be periodically repeated; and, a time period that serves as the interval between security assessments. Alternatively, the API 338 may be configured to receive the request, determine its contents, and then control the scanning service 310 to implement the security assessment according to the user input. The scanning service 310 may obtain the identified rules package (e.g., from the scan configuration data store 340). The scanning service 310 may obtain the volume image 308 of the virtual machine 312, use the volume image 308 to launch the assessment virtual machine 312A, B, and install the security agent program 330 in the assessment virtual machine's 312A, B second logical volume 316 as described above and in accordance with the user input. Subsequently, the API 338, the scanning service 310, or another computing service (e.g., a system timekeeper) may generate a trigger event when the designated time period has elapsed since the security assessment was last performed. In response to the trigger event, the scanning service 310 may again execute the security assessment.

In some embodiments, the scanning service 310 can cause processing activity to occur within the assessment virtual machine 312A-B in order to apply tasks of the security assessment to real-time dynamic or static data, network connections, communications to computing resources, and other computational activities of the assessment virtual machine 312A-B. In order to stimulate activity that mirrors the activity of the target virtual machine 312, the snapshot data may need to include some such activity of the virtual machine 312. The scanning service 310 may therefore cause the snapshot to be captured for a capture period that lasts a predetermined duration; during the capture period, the capturing device may monitor all relevant communications, data processing, and other activities of the virtual machine 312, storing in the snapshot data a real-time snapshot describing the activity and connections of the virtual machine 312. Additionally or alternatively, the statically captured snapshot data described above may include data that describes the expected activity and/or connections.

In various embodiments, using the snapshot data of either or both of the static virtual machine 312 and the active virtual machine 312 (i.e., captured over the capture period), upon regenerating the snapshot 308 as the assessment virtual machine 312A-B, the scanning service 310 may cause the assessment virtual machine 312A-B to intercept traffic to the target virtual machine 312 and duplicate the intercepted traffic to the assessment virtual machine 312A-B in order to stimulate activity in the assessment virtual machine 312A-B. Thus, substantially identical activity may be produced for testing. Additionally or alternatively, the scanning system 310 may cause such interception of traffic before or during generation of the snapshot data, in order to create a profile of the traffic to the target virtual machine 312. The scanning system 310 may then use this profile to determine assessment tasks to perform, and/or to generate "dummy" traffic to the assessment virtual machine 312A-B that is similar to the traffic of the target virtual machine 312. In some embodiments, the scanning system 310 or an external agent deployed by the scanning system 310 may perform destructive testing on the assessment virtual machine 312A-B to verify the system's health.

Figure 4:
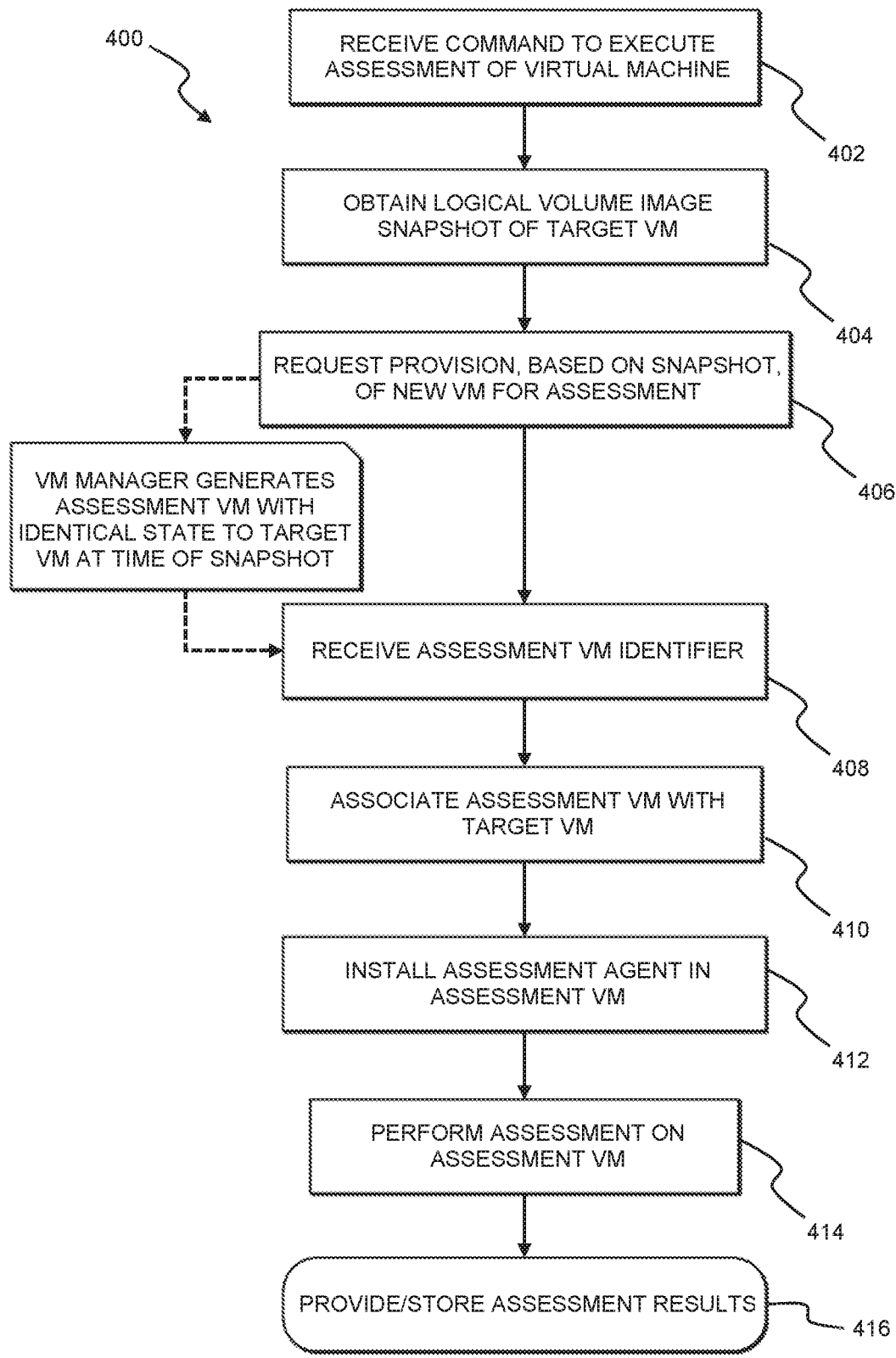
FIG. 4 is a flow diagram of another example method for executing the security assessment of one or more virtual machines in the virtual computing environment.

FIG. 4 illustrates an example method 400 of performing a security assessment of a target virtual machine (VM) in a computing environment like the example computing environments 300, 350 of FIGS. 3A-B. At step 402, the scanning service may receive a signal to execute the security assessment of the target virtual machine, as described above with respect to FIG. 2. At step 404, the scanning service obtains a logical volume image snapshot, such as a block-level image of the physical storage device, of the target VM. For example, the scanning service engages a snapshot service of the computing resource service provider to capture the snapshot at a certain time.

At step 406, the scanning service may request the provision of a new VM instance that is a duplicate of the target VM instance. For example, the scanning service may provide the snapshot to a hypervisor, which provisions the assessment VM instance based on the snapshot. In another embodiment, the scanning service may provide one or more parameters of a logical volume (e.g., size, file system) to the hypervisor, which provisions the logical volume accessible by the scanning service, and the scanning service may install the snapshot into the logical volume to instantiate the assessment VM. At step 408, the scanning service may receive or determine the identifier of the assessment virtual machine instance, indicating the assessment VM was successfully instantiated. The scanning service may, at step 410, associate the assessment VM with the target VM in order to maintain the relationship between the virtual machines so the assessment results can later be associated with the target VM.

At step 412, with the assessment VM instantiated, the scanning service may install the security agent program into the assessment VM instance. At step 414, the scanning service may perform the security assessment on the assessment VM instance, such as by activating the security agent program to execute one or more tasks of the security assessment, receiving outcomes of the tasks, and comparing the outcomes to assessment rules to produce assessment results. At step 416, the scanning system may store, provide to the user, or perform other actions on the assessment results, as described above with respect to FIG. 2.

Figure 5A:
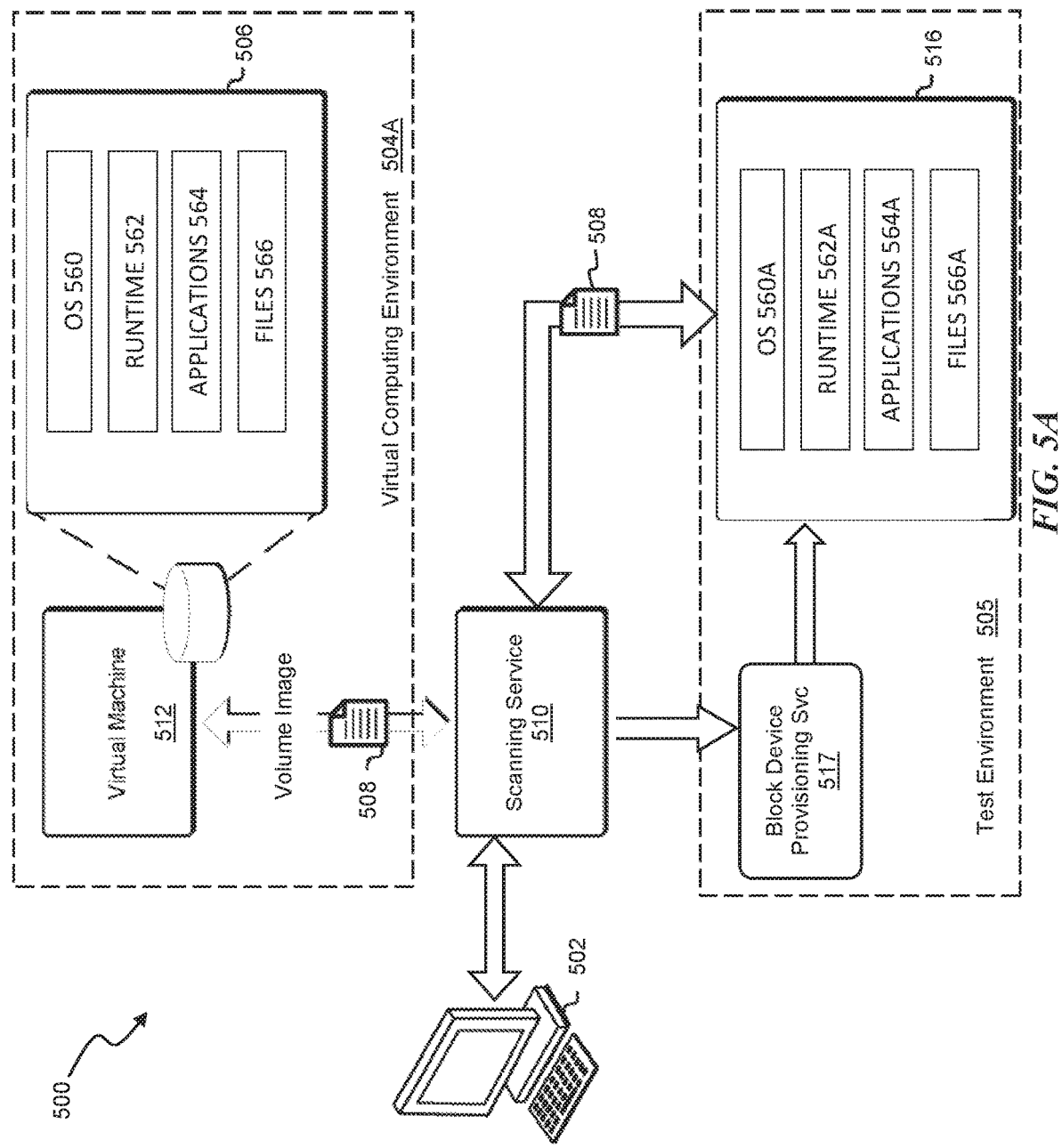
FIG. 5A is a diagram illustrating another example system for executing a security assessment of a virtual machine using a test environment, in accordance with the present disclosure.
Figure 5B:
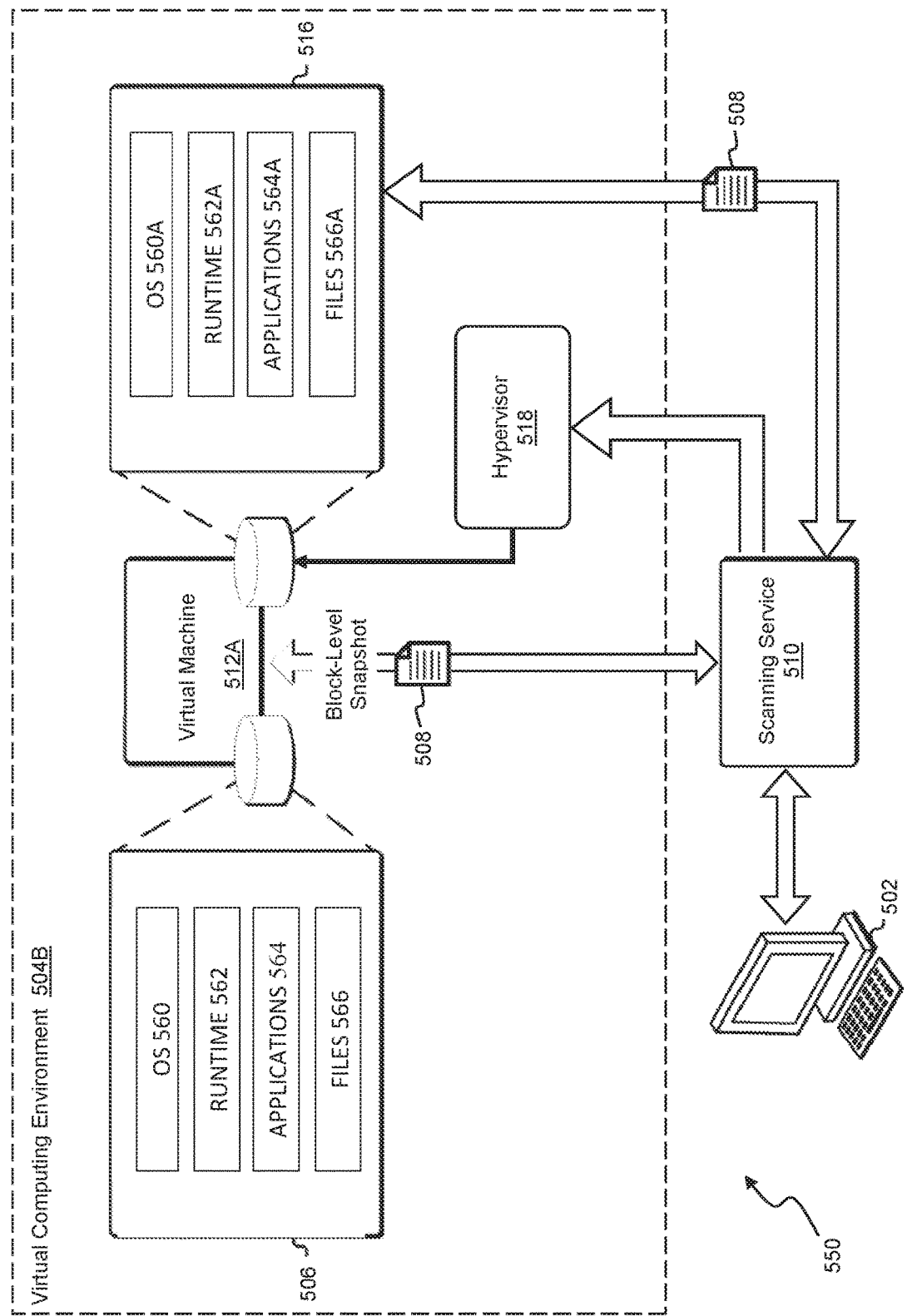
FIG. 5B is a diagram illustrating another example system for executing an example security assessment of a virtual machine, in accordance with the present disclosure.

FIGS. 5A-B illustrate example computing environments 500, 550 providing additional embodiments of the present security assessment systems. The examples again use a virtual machine 512 as the example target computing resource of the security assessment; the user device 502, virtual computing environment 504A, logical volume 506 (with virtual machine 512 operating system 560, runtime environment 562, software applications 564, and files/file system 566), virtual machine 512, and volume image 508, as well as their implementation and interactions, are the same as described above for the associated components 302, 304A, 306, 308, 312, 360-366 of FIGS. 3A-B. In the implementations of FIGS. 5A-B, rather than recreating and instantiating a duplicate VM, the scanning service 510 is configured to analyze the volume image 508 as a data file. The scanning service 510 may transform the volume image 508 into a format in which the scanning service 510 can read the copied files and other data; in the illustrated examples, the scanning service 510 does this by mounting the volume image as a virtual storage device.

Referring to FIG. 5A, the "duplicate" of the virtual machine 512 may be created in a test environment 505 outside of the virtual computing environment 504A for the reasons stated above. The scanning service 510 may request a provisioning service 517 of the test environment 505 to allocate a logical volume 516 for use by the scanning service 510. The scanning service may determine the size and other attributes, such as the file system, of the volume image 508 and include the attributes as parameters of the request for provisioning, and the provisioning service 517 or the scanning service 510 may allocate physical resources, such as a block-level storage device or a partition thereof, and create the logical volume 516 in the allocated resources with the corresponding file system type, appropriate size, etc. The scanning service 510 may then mount the volume image 508 in the new logical volume 516 so that the scanning service 510 can access the volume image 508 (e.g., can read files and other data such as the OS 560A, runtime environment 562A, software applications 564A, and files/file system 566A) as if it were a disk drive.

Alternatively as shown in FIG. 5B, the scanning service 510 may communicate with a provisioning service of the virtual computing environment 504B, such as a hypervisor 518, in order to allocate a logical volume 516 within the virtual computing environment 504B for the security assessment. The scanning system 510 may mount the volume image 508 within the logical volume 516 as a virtual disk drive, as described above. The scanning system 510 may further cause the logical volume 516 to be attached to the virtual machine 512 instance that was imaged, as an additional virtual hard drive. For example, the hypervisor 518 may allocate to the logical volume 516 physical resources of the same physical computing device(s) on which the virtual machine 512A is executing. This may create efficiencies, such as by retaining connections to resources that must be assessed, and maintaining the associated between the target virtual machine 512A and the logical volume 516 containing the mounted volume image. In other embodiments, one or more hypervisors 518 may control allocation of physical resources of multiple different physical computing devices to virtualized components operating in the virtual computing environment 504B. For clarity of illustration, FIG. 5B illustrates a single hypervisor 518 controlling the computing resources for both the target virtual machine 512A and the logical volume 516; the illustrated hypervisor 518 may represent multiple hypervisors 518 that, for example, each control allocation of physical resources on a different particular physical computing device. The hypervisor(s) 518 may allocate, to the logical volume 516, physical resources on different physical computing devices than the physical computing device(s) on which the target virtual machine 512A is executing. For example, a first hypervisor 518 on a first physical computing device may allocate resources to and launch the target virtual machine 512A on the first physical computing device, and a second hypervisor 518 on a second physical computing device may allocate resources to the logical volume 516 on the second physical computing device.

The scanning service 510 may mount volume images as read only to avoid inadvertently modifying the volume corresponding to a volume image. A public key or other cryptographically verified information may be applied to the volume image 508 to verify the identity and authenticity of the data. In addition, the volume image 508 may be encrypted and the scanning service 510 may require access to the encryption key to perform the analysis. The encryption key may be maintained in a security module or security service (not shown) of the computing resource service provider. In these embodiments, the scanning service 510 gains access to the key by obtaining credential information from the user and may also obtain key identification information if necessary. Alternatively, the user may maintain the key and provide the scanning service 510 with the key.

Figure 6:
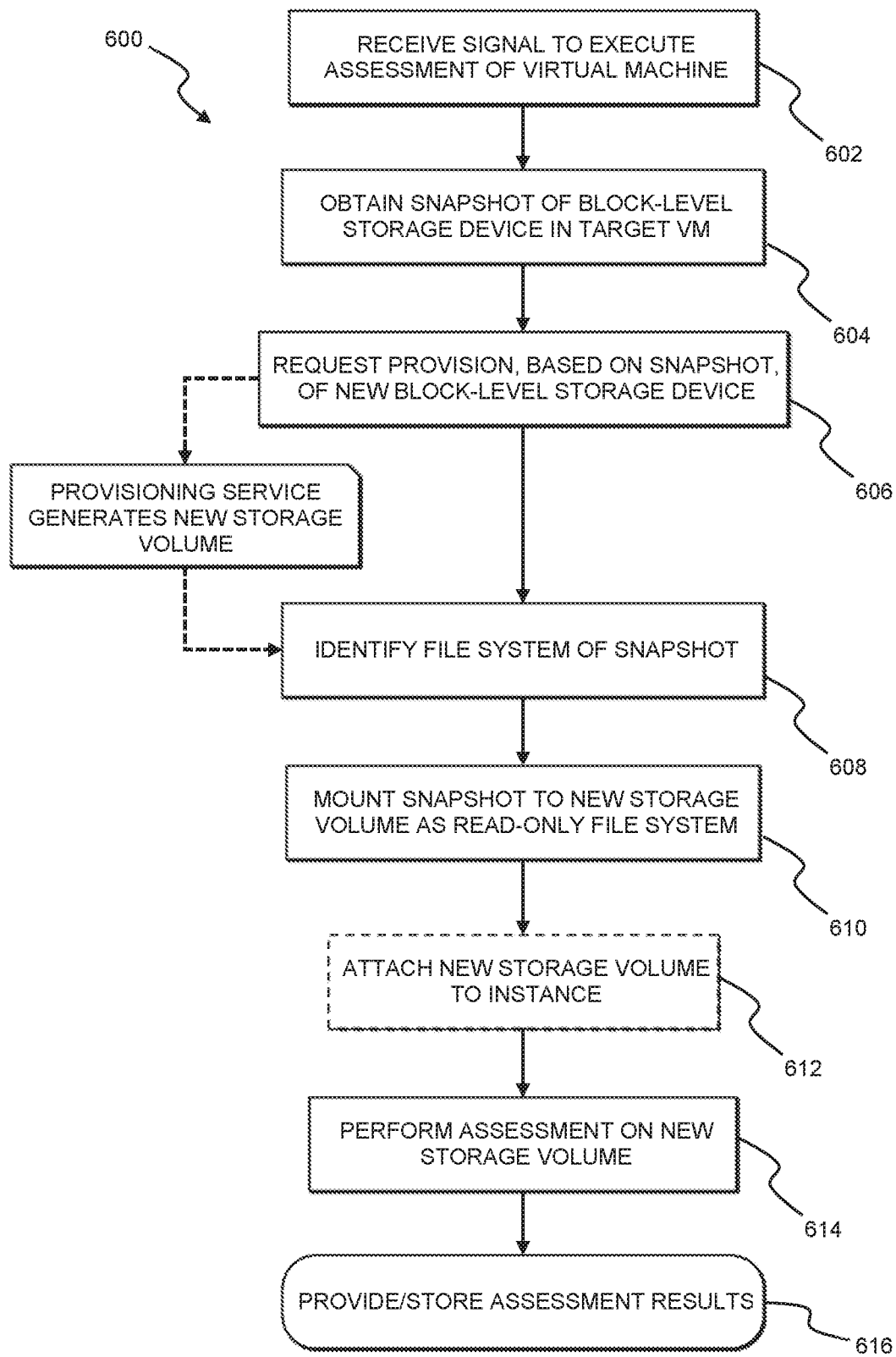
FIG. 6 is a flow diagram of another example method for executing the security assessment of one or more virtual machines in the virtual computing environment.

FIG. 6 illustrates a method 600 of performing a security assessment in a computing environment such as the environments 500, 550 of FIGS. 5A-B. The scanning service may receive a signal to assess a virtual machine (step 602) and obtain a snapshot (i.e., volume image) of the virtual machine (step 604) as described above. At step 606, the scanning service may request the provision of a new block-level storage device allocation and/or a logical volume. At step 608, the scanning service may identify the file system of the block-level device and/or the logical volume that was copied to produce the volume image. At step 610, the scanning service may format the new logical volume into the corresponding file system and then mount the volume image in the logical volume as a read-only virtual hard disk. Optionally at step 612, the scanning service may attach the mounted volume image to the original virtual machine instance that was imaged. At step 614, the scanning service may perform the security assessment by reading the files of the mounted volume image. In some embodiments, the scanning service may use string or other pattern comparisons to identify files, software packages, application versions, and the like, for software installed on the target virtual machine 312. For example, once the file system of the mounted volume image can be read, the scanning service may compare the names of directories and/or files in the image to character patterns representing known directory and/or filenames to identify "signature" directories and files that identify the software application, version, installation attributes, etc. The scanning service may maintain a database of such character patterns. Further, the scanning service may maintain a database of assessment tasks (e.g., the scan parameter data store 130 of FIG. 1) that are associated with particular software applications and versions thereof. In this manner, the scanning service may identify which assessment tasks to run based on the installed software packages. The scanning service may then, in some embodiments, run the assessment tasks on the raw file data of the mounted volume image to obtain the assessment results. At step 616, the scanning service may perform actions on the assessment results, such as storing or delivering the results, as described above.

Figure 7:
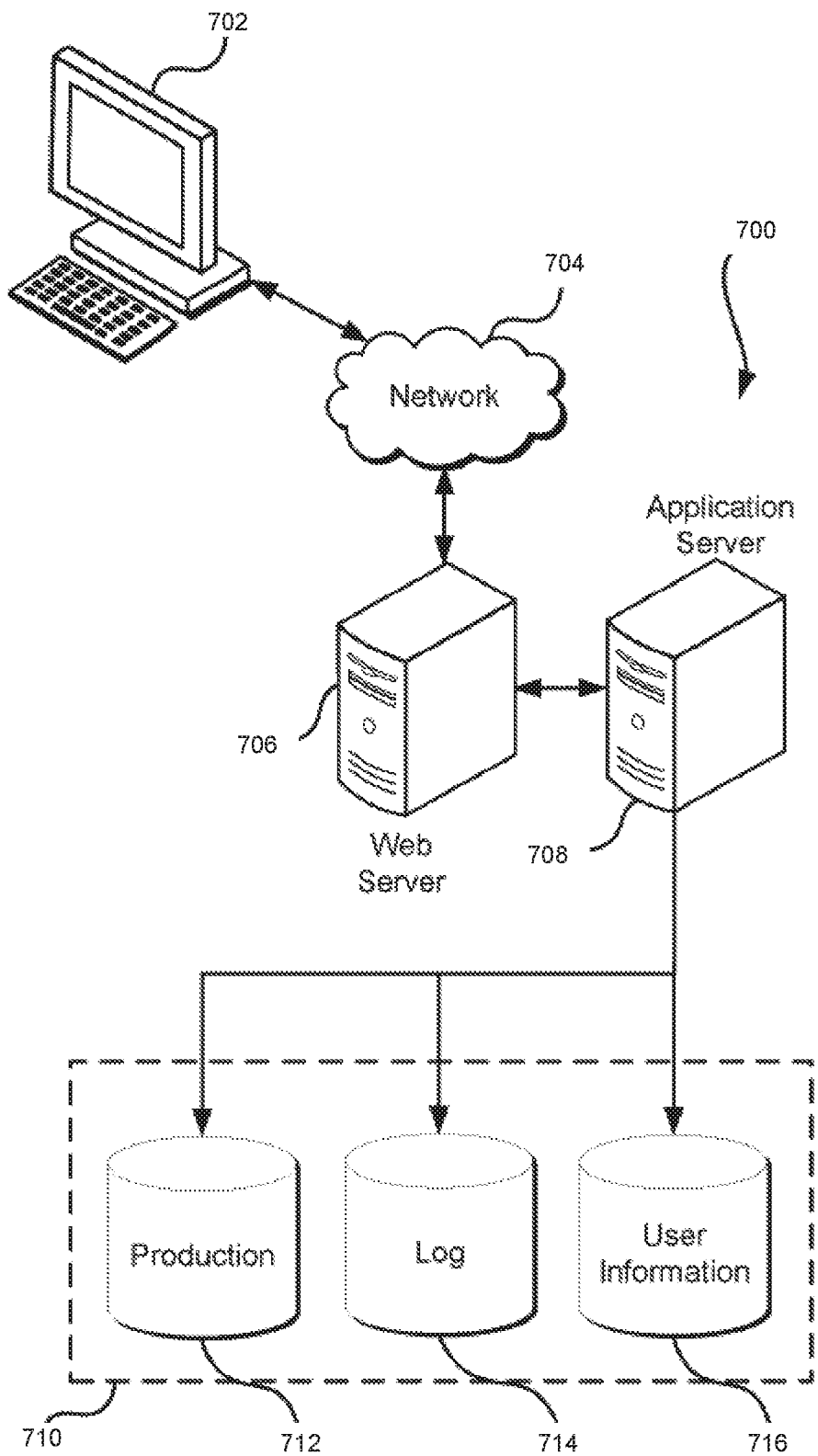
FIG. 7 is a diagram of an environment in which various embodiments of the present disclosure can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 702 and the application server 708, can be handled by the web server using PHP, Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system in FIG. 7 should be taken as being illustrative in nature and not limiting to the scope of the disclosure.

Thus, in one aspect, the present disclosure provides a system, including a memory and a processor, the memory including computer-executable instructions that upon execution cause the system to: receive a request to perform a security assessment of a first virtual machine instance, the first virtual machine instance having a first logical volume; obtain access to a first volume image of the first logical volume generated at a first point in time; cause a second virtual machine instance to be run using the first volume image; perform a security assessment on the second virtual machine instance to produce a first assessment result describing a security vulnerability of the first virtual machine instance; and, associate the first assessment result with the first virtual machine instance. The computer-executable instructions upon execution may further cause the system to: install a security agent program within the second virtual machine instance, the security agent program configured to, upon execution, collect telemetry data of the second virtual machine instance, the telemetry data indicating network activity, file system activity, or processing activity, and send the telemetry data to the system; receive the telemetry data for a duration of the security assessment; and, analyze the telemetry data using assessment rules to produce the first assessment result.

The computer-executable instructions upon execution may further cause the system to associate the first volume image with a user account associated with the first virtual machine, and store the first volume image in a data store. The computer-executable instructions upon execution may further cause the system to cause the second virtual machine instance to be run in a virtual network of a user account associated with the first virtual machine instance, and analyze a connection of the second virtual machine instance to a restricted resource associated with the user account. The computer-executable instructions upon execution may further cause the system to: receive a request identifying a user account associated with the first virtual machine instance, the request including a request to perform periodic security assessments on the first virtual machine instance; and, in response to a trigger event, generate the request to perform the security assessment, the trigger event occurring based on a time period specified by the request to perform periodic security assessments.

In another aspect, the present disclosure provides a system including one or more hardware computing devices configured to execute specific computer-executable instructions that upon execution cause the one or more hardware computing devices to: receive a command to initiate a security assessment of a first computing resource having a first logical volume storing information for implementing the first computing resource; obtain access to a first data describing a first state of the first logical volume at a first time; perform the security assessment using the first data to produce a first assessment result; and associate the first assessment result with the first computing resource. The first data may include an identifier of the first computing resource, and to obtain access to the first data, the one or more hardware computing devices may be further configured to execute specific computer-executable instructions that upon execution cause the one or more hardware computing devices to: obtain the identifier; access a storage service containing the first data; and, use the identifier to retrieve the first data.

To perform the security assessment using the first data, the one or more hardware computing devices may be further configured to execute specific computer-executable instructions that upon execution cause the one or more hardware computing devices to use the first data to launch a second computing resource and install an agent on the second computing resource, wherein the agent includes executable instructions that cause the agent to perform the security assessment. The security assessment may include an evaluation of a virtual machine configuration, the first computing resource of this aspect may be a first virtual machine instance, and to perform the security assessment the one or more hardware computing devices may be further configured to execute specific computer-executable instructions that upon execution cause the one or more hardware computing devices to: determine, based at least in part on the first data, that the first virtual machine instance has the virtual machine configuration; generate, using the first data, a second virtual machine instance having the virtual machine configuration; and, perform the security assessment on the second virtual machine instance.

The first data may include a volume image of the first logical volume, and to perform the security assessment using the first data, the one or more hardware computing devices may be further configured to execute specific computer-executable instructions that upon execution cause the one or more hardware computing devices to: request, from a computing resource service provider in communication with the one or more hardware computing devices, an allocation of physical storage resources; create a second logical volume on the allocation of physical storage resources; mount the volume image into the second logical volume to produce a mounted volume; and, perform the security assessment on the mounted volume. To mount the image into the second logical volume, the one or more hardware computing devices may be further configured to execute specific computer-executable instructions that upon execution cause the one or more hardware computing devices to: determine, from the first data, a first type of a file system of the first logical volume; transform, using the first type, the volume image into a virtual storage device having the file system of the first logical volume and comprising a plurality of data files that implement the first computing resource; and, mount the virtual storage device into the second logical volume such that the plurality of data files are readable using disk access operations on the second logical volume, wherein the virtual storage device contains the representation of the first computing resource, and the security assessment is performed on the virtual storage device. To perform the security assessment, the one or more hardware computing devices may be further configured to execute specific computer-executable instructions that upon execution cause the one or more hardware computing devices to: identify, from the plurality of data files, a plurality of file directories stored on the virtual storage device; compare the plurality of file directories to each of one or more character patterns to identify a software application installed on the first logical volume; determine a plurality of tasks in the security assessment that are associated with the software application; and, perform the plurality of tasks on the virtual storage device. The first computing resource may be a first virtual machine instance, and the one or more hardware computing devices may be further configured to execute specific computer-executable instructions that upon execution cause the one or more hardware computing devices to: determine that the first virtual machine instance is executing in a virtual computing environment of the computing resource service provider, the virtual computing environment limiting connection of the first virtual machine instance to external computing resources that are not included in the virtual computing environment; and, associate the second logical volume with the first virtual machine instance such that the second logical volume is included in the virtual computing environment.

The first data may include a plurality of data files required to implement, in the first logical volume, a target virtual machine; to obtain access to the first data, the one or more hardware computing devices may be further configured to execute specific computer-executable instructions that upon execution cause the one or more hardware computing devices to cause a service associated with a computing resource service provider of the first computing resource to copy the plurality of data files into the first data and make the first data accessible to the one or more hardware computing devices. To configure the second logical volume, the one or more hardware computing devices may be further configured to execute specific computer-executable instructions that upon execution cause the one or more hardware computing devices to: determine, based on one or both of the first data and an identifier of the target virtual machine, a template configuration used to instantiate the target virtual machine from the first logical volume; obtain the plurality of data files from the first data; combine the template configuration with the plurality of data files to create, in the second logical volume as the representation of the first computing resource, a second virtual machine; and, enable the computing resource service provider to create an instance of the second virtual machine from the second logical volume, wherein the security assessment is performed on the instance of the second virtual machine.

In yet another aspect, the present disclosure provides a computer-implemented method that includes the steps of: receiving a signal initiating a security assessment of a first computing resource of a computing resource service provider, the first computing resource including one or more first virtual machines; obtaining access to a first data file containing data describing a first state of the first computing resource at a first time; configuring, based at least in part on the first data file, a second computing resource to include a representation of the first computing resource in the first state; performing the security assessment on the second computing resource to produce a first assessment result describing one or more security vulnerabilities of the first computing resource; and, associating the first assessment result with the first computing resource. The method may further include the steps of: obtaining access to a second data file describing a second state of the first computing resource at a second time; configuring, based at least in part on the second data file, a third computing resource to include a representation of the first computing resource in the second state; performing the security assessment on the third computing resource to produce a second assessment result describing the one or more security vulnerabilities of the first computing resource; associating the second assessment result with the first computing resource; and, comparing the first assessment result and the second assessment result to determine that a first security vulnerability of the one or more security vulnerabilities was resolved between the first time and the second time.

The method may further include the steps of: receiving a request to perform periodic security assessments on the first computing resource, the request generated by an entity authorized to control the first computing resource; determining that the request identifies a time period and a configuration of the security assessment, the security assessment being performed based on the configuration; and, in response to a trigger event, generate the signal, the trigger event occurring based on the time period. The security assessment may be configured to evaluate the one or more security vulnerabilities based on a virtual machine configuration, and the computing resource service provider may be configured to create a target instance of the one or more virtual machines, the target instance having the virtual machine configuration; therein, the step of configuring the second computing resource may include creating, based on the first data file, a second virtual machine of the second computing resource, and the step of performing the security assessment may include causing the computing resource service provider to create an assessment instance of the second virtual machine, the assessment instance having the virtual machine configuration; the method may further include the step of performing the security assessment on the assessment instance.

The method may further include the step of determining that the virtual machine configuration describes a first connection to a first virtual computing resource that accepts connections from virtual machine instances that are included in a virtual computing environment including the target instance, and rejects connections from virtual machine instances that are not included in the virtual computing environment. The step of causing the computing resource service provider to create the assessment instance may include the steps of: receiving a user input indicating that a user of the computing resource service provider, the user controlling the virtual computing environment, authorizes creating the assessment instance in the virtual computing environment; and, causing the computing resource service provider to create the assessment instance inside the virtual computing environment such that the assessment instance establishes the first connection to the first virtual computing resource.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, including a memory and a processor, the memory including computer-executable instructions that upon execution by the processor cause the system to:
   receive a request to perform a security assessment of a first virtual machine instance, the first virtual machine instance including a first logical volume, the first virtual machine instance being configured to operate within a virtual network of a user of the system and associated with a user account of the user;
   obtain access to a first volume image of the first logical volume generated at a first point in time;
   cause a second virtual machine instance to be run, using the first volume image, in the virtual network of the user;
   cause the second virtual machine instance to establish a connection to a restricted computing resource associated with the user account associated with the first virtual machine instance;
   perform the security assessment on the second virtual machine instance to produce a first assessment result describing a security vulnerability of the first virtual machine instance, the security assessment including analyzing the connection of the second virtual machine instance to the restricted resource; and
   associate the first assessment result with the first virtual machine instance.

2. The system of claim 1, wherein the computer-executable instructions upon execution by the processor further cause the system to:
   install a security agent program within the second virtual machine instance, the security agent program configured to, upon execution:
      collect telemetry data of the second virtual machine instance, the telemetry data indicating network activity, file system activity, or processing activity; and
      send the telemetry data to the system;
   receive the telemetry data for a duration of the security assessment; and
   analyze the telemetry data using assessment rules to produce the first assessment result.

3. The system of claim 1, wherein the computer-executable instructions upon execution by the processor further cause the system to:
   associate the first volume image with the user account associated with the first virtual machine instance; and
   store the first volume image in a data store.

4. The system of claim 1, wherein the computer-executable instructions upon execution by the processor further cause the system to:
   receive a request identifying the user account associated with the first virtual machine instance, the request including a request to perform periodic security assessments on the first virtual machine instance; and
   in response to a trigger event, generate the request to perform the security assessment, the trigger event occurring based on a time period specified by the request to perform the periodic security assessments.

5. The system of claim 1 wherein said performing the security assessment on the second virtual machine instance includes:
   intercepting network traffic directed to the first virtual machine instance and routing the intercepted network traffic to the first virtual machine instance;
   analyzing the intercepted network traffic and generating a traffic profile describing characteristics of the intercepted network traffic;
   generating simulated network traffic including characteristics described by the traffic profile;
   directing the simulated network traffic to the second virtual machine instance;
   generating a partial assessment result for the first virtual machine instance by analyzing behavior of the second virtual machine instance in response to the simulated network traffic; and
   including the partial assessment result in the first assessment result.

6. A system, comprising one or more hardware computing devices configured to execute specific computer-executable instructions that upon execution cause the one or more hardware computing devices to:
   receive a command to initiate a security assessment of a first computing resource including a first logical volume storing information for implementing the first computing resource, the first computing resource being configured to operate within a virtual network of a user of the system and being associated with a user account of the user;
   obtain access to a first data describing a first state of the first logical volume at a first time;
   use the first data to launch a second computing resource in the virtual network of the user that is associated with the user account of the user;
   perform the security assessment using the first data to produce a first assessment result, the security assessment including analyzing a connection of the second computing resource to a restricted resource associated with the user account of the user associated with the first computing resource; and
   associate the first assessment result with the first computing resource.

7. The system of claim 6, wherein the first data includes an identifier of the first computing resource, and to obtain access to the first data, the one or more hardware computing devices are further configured to execute specific computer-executable instructions that upon execution cause the one or more hardware computing devices to:
   obtain the identifier;
   access a storage service containing the first data; and
   use the identifier to retrieve the first data.

8. The system of claim 6, wherein to perform the security assessment using the first data, the one or more hardware computing devices are further configured to execute specific computer-executable instructions that upon execution cause the one or more hardware computing devices to install an agent on the second computing resource, the agent including executable instructions that, when executed, cause the agent to perform the security assessment.

9. The system of claim 6, wherein the security assessment includes an evaluation of a virtual machine configuration, the first computing resource is a first virtual machine instance, and to perform the security assessment the one or more hardware computing devices are further configured to execute specific computer-executable instructions that upon execution cause the one or more hardware computing devices to:
   determine, based at least in part on the first data, that the first virtual machine instance has the virtual machine configuration;

generate, using the first data, a second virtual machine instance including the virtual machine configuration; and perform the security assessment on the second virtual machine instance.

10. The system of claim 6, wherein the first data comprises a volume image of the first logical volume, and to perform the security assessment using the first data, the one or more hardware computing devices are further configured to execute specific computer-executable instructions that upon execution cause the one or more hardware computing devices to:

request, from a computing resource service provider in communication with the one or more hardware computing devices, an allocation of physical storage resources;

create a second logical volume on the allocation of physical storage resources;

mount the volume image into the second logical volume to produce a mounted volume; and perform the security assessment on the mounted volume.

11. The system of claim 10, wherein to mount the image into the second logical volume, the one or more hardware computing devices are further configured to execute specific computer-executable instructions that upon execution cause the one or more hardware computing devices to:

determine, from the first data, a first type of a file system of the first logical volume;

transform, using the first type, the volume image into a virtual storage device comprising the file system of the first logical volume and a plurality of data files that implement the first computing resource; and mount the virtual storage device into the second logical volume such that the plurality of data files are readable using disk access operations on the second logical volume;

wherein the virtual storage device contains a representation of the first computing resource, and the security assessment is performed on the virtual storage device.

12. The system of claim 11, wherein to perform the security assessment, the one or more hardware computing devices are further configured to execute specific computer-executable instructions that upon execution cause the one or more hardware computing devices to:

identify, from the plurality of data files, a plurality of file directories stored on the virtual storage device;

compare the plurality of file directories to each of one or more character patterns to identify a software application installed on the first logical volume;

determine a plurality of tasks in the security assessment that are associated with the software application; and perform the plurality of tasks on the virtual storage device.

13. The system of claim 11, wherein the first computing resource is a first virtual machine instance, and the one or more hardware computing devices are further configured to execute specific computer-executable instructions that upon execution cause the one or more hardware computing devices to:

determine that the first virtual machine instance is executing in a virtual computing environment of the computing resource service provider, the virtual computing environment limiting connection of the first virtual machine instance to external computing resources that are not included in the virtual computing environment; and associate the second logical volume with the first virtual machine instance such that the second logical volume is included in the virtual computing environment.

14. The system of claim 6, wherein:

the first data comprises a plurality of data files required to implement, in the first logical volume, a target virtual machine; and to obtain access to the first data, the one or more hardware computing devices are further configured to execute specific computer-executable instructions that upon execution cause the one or more hardware computing devices to cause a service associated with a computing resource service provider of the first computing resource to copy the plurality of data files into the first data and make the first data accessible to the one or more hardware computing devices.

15. The system of claim 14, wherein to configure the second logical volume, the one or more hardware computing devices are further configured to execute specific computer-executable instructions that upon execution cause the one or more hardware computing devices to:

determine, based on one or both of the first data and an identifier of the target virtual machine, a template configuration used to instantiate the target virtual machine from the first logical volume;

obtain the plurality of data files from the first data;

combine the template configuration with the plurality of data files to create, in the second logical volume as the representation of the first computing resource, a second virtual machine; and enable the computing resource service provider to create an instance of the second virtual machine from the second logical volume;

wherein the security assessment is performed on the instance of the second virtual machine.

16. A method implemented by one or more hardware computing devices, the method comprising:

receiving a signal initiating a security assessment of a first computing resource of a computing resource service provider, the first computing resource comprising one or more first virtual machines operating within a virtual computing environment and associated with a user account of a user of the computing resource service provider and communicating within a virtual network of the virtual computing environment;

obtaining access to a first data file containing data describing a first state of the first computing resource at a first time;

configuring, based at least in part on the first data file, a second computing resource comprising a representation of the first computing resource in the first state;

causing the second computing resource to operate in the virtual computing environment associated with the user account of the user; and performing the security assessment on the second computing resource to produce a first assessment result describing one or more security vulnerabilities of the first computing resource by, at least in part, analyzing a connection of the second computing resource to a restricted resource associated with the user account of the user associated with the first computing resource; and associating the first assessment result with the first computing resource.

17. The method of claim 16, further comprising:

obtaining access to a second data file describing a second state of the first computing resource at a second time;

configuring, based at least in part on the second data file, a third computing resource comprising a representation of the first computing resource in the second state;

performing the security assessment on the third computing resource to produce a second assessment result describing the one or more security vulnerabilities of the first computing resource;

associating the second assessment result with the first computing resource; and comparing the first assessment result and the second assessment result to determine that a first security vulnerability of the one or more security vulnerabilities was resolved between the first time and the second time.

18. The method of claim 16, wherein the security assessment evaluates the one or more security vulnerabilities based on a virtual machine configuration, and the computing resource service provider is configured to create a target instance of the one or more virtual machines, the target instance including the virtual machine configuration, and wherein:

configuring the second computing resource comprises creating, based on the first data file, a second virtual machine of the second computing resource; and performing the security assessment comprises:

causing the computing resource service provider to create an assessment instance of the second virtual machine, the assessment instance including the virtual machine configuration; and performing the security assessment on the assessment instance.

19. The method of claim 18, further comprising determining that the virtual machine configuration describes a first connection to a first virtual computing resource that accepts connections from virtual machine instances that are included in the virtual computing environment, the virtual computing environment including the target instance, and rejecting connections from virtual machine instances that are not included in the virtual computing environment;

wherein causing the computing resource service provider to create the assessment instance comprises:

receiving a user input indicating that the user of the computing resource service provider, the user controlling the virtual computing environment, authorizes creating the assessment instance in the virtual computing environment; and causing the computing resource service provider to create the assessment instance inside the virtual computing environment such that the assessment instance establishes the first connection to the first virtual computing resource.

* * * * *